(12) United States Patent
Yoon et al.

(10) Patent No.: US 8,828,611 B2
(45) Date of Patent: Sep. 9, 2014

(54) NON-AQUEOUS ELECTROLYTE AND ELECTROCHEMICAL DEVICE COMPRISING THE SAME

(75) Inventors: Su-Jin Yoon, Gyeonggi-do (KR); Jeong-Ju Cho, Daejeon (KR); Ho-Chun Lee, Daejeon (KR)

(73) Assignee: LG Chem, Ltd. (KR)

( * ) Notice: Subject to any disclaimer, the term of this patent is extended or adjusted under 35 U.S.C. 154(b) by 530 days.

(21) Appl. No.: 12/442,601

(22) PCT Filed: Sep. 19, 2007

(86) PCT No.: PCT/KR2007/004533
§ 371 (c)(1),
(2), (4) Date: Sep. 23, 2009

(87) PCT Pub. No.: WO2008/038930
PCT Pub. Date: Apr. 3, 2008

(65) Prior Publication Data
US 2010/0035160 A1 Feb. 11, 2010

(30) Foreign Application Priority Data
Sep. 25, 2006 (KR) .................. 10-2006-0093126

(51) Int. Cl.
*H01M 6/18* (2006.01)
(52) U.S. Cl.
USPC ........... 429/317; 429/303; 429/300; 252/62.2
(58) Field of Classification Search
USPC .................. 429/317, 303, 300; 252/62.2
See application file for complete search history.

(56) References Cited

U.S. PATENT DOCUMENTS

| | | | |
|---|---|---|---|
| 5,223,353 A | 6/1993 | Ohsawa et al. | |
| 5,435,054 A | 7/1995 | Tonder et al. | |
| 5,620,810 A * | 4/1997 | Golovin et al. | 429/317 |
| 5,648,011 A | 7/1997 | Blonsky | |
| 6,680,147 B2 * | 1/2004 | Lee | 429/303 |
| 6,706,449 B2 | 3/2004 | Mikhaylik et al. | |
| 2003/0152837 A1 | 8/2003 | Noh | |
| 2004/0029009 A1 | 2/2004 | Sada et al. | |
| 2005/0019669 A1 | 1/2005 | Han et al. | |
| 2005/0227150 A1 | 10/2005 | Xing et al. | |
| 2005/0271939 A1 | 12/2005 | Xu et al. | |

FOREIGN PATENT DOCUMENTS

| | | |
|---|---|---|
| CN | 1421953 A | 6/2003 |
| CN | 1423364 A | 6/2003 |
| CN | 1744369 A | 3/2006 |
| EP | 0450981 A1 | 10/1991 |
| EP | 0823744 A2 | 2/1998 |
| EP | 1619743 A2 | 1/2006 |
| JP | 9035705 A | 2/1997 |
| JP | 2000230019 A | 8/2000 |
| JP | 2002-158034 | 5/2002 |
| JP | 2003-168479 | 6/2003 |
| JP | 2004327362 A | 11/2004 |
| KR | 20010016917 B1 | 3/2001 |
| KR | 20020071776 | 9/2002 |
| KR | 100400215 B1 | 9/2003 |
| KR | 100434556 B1 | 6/2004 |
| KR | 20050056994 | 6/2005 |

OTHER PUBLICATIONS

Office Action from corresponding Chinese Applcation No. 200780035380.0 issued Aug. 19, 2010.
International Search Report, PCT/KR2007/004533.
Supplementary European Search Report EP 07808323, dated Mar. 29, 2012.

* cited by examiner

*Primary Examiner* — Laura Weiner
(74) *Attorney, Agent, or Firm* — Lerner, David, Littenberg, Krumholz & Mentlik, LLP

(57) ABSTRACT

Disclosed is a non-aqueous electrolyte comprising: a first acrylate compound having one or two acryl groups; a second acrylate compound having three or more acryl groups; an electrolyte salt; and an organic solvent. Also, disclosed is an electrode comprising a coating layer formed partially or totally on a surface thereof, the coating layer comprising: (i) a reduced form of a first acrylate compound having one or two acryl groups; and (ii) a reduced form of a second acrylate compound having three or more acryl groups. Further, disclosed in an electrochemical device comprising a cathode, an anode, a separator and a non-aqueous electrolyte, wherein (i) the non-aqueous electrolyte is the above non-aqueous electrolyte; and/or (ii) the cathode and/or the anode is the above electrode.

11 Claims, 1 Drawing Sheet

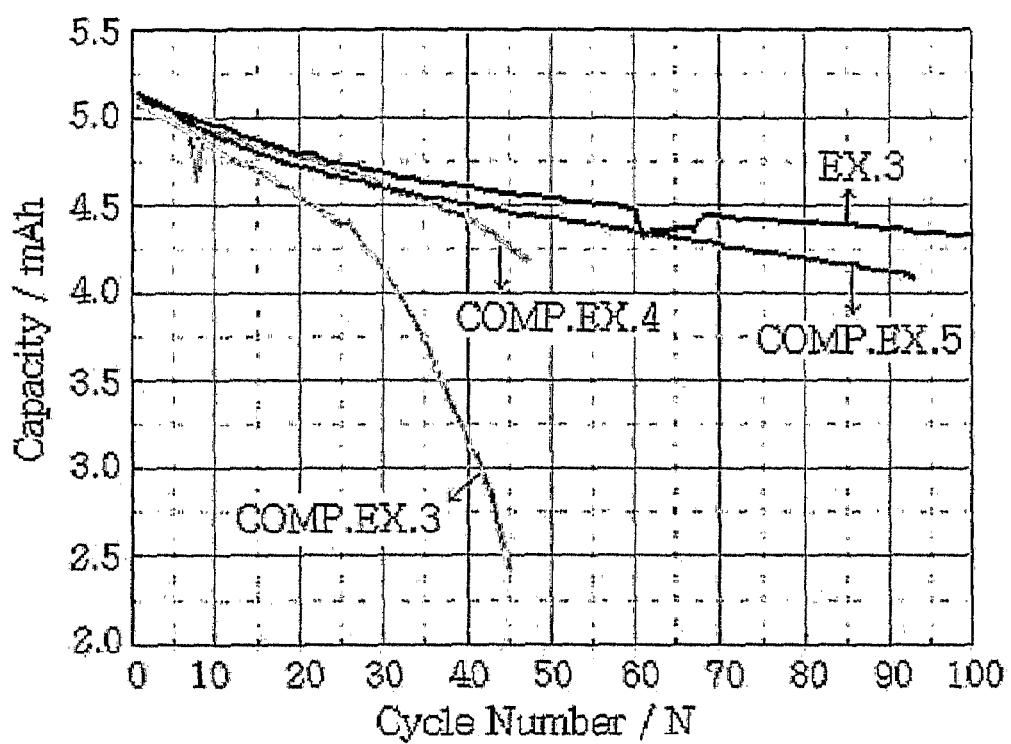

NON-AQUEOUS ELECTROLYTE AND ELECTROCHEMICAL DEVICE COMPRISING THE SAME

CROSS REFERENCE TO RELATED APPLICATIONS

The present application is a national phase entry under 35 U.S.C. §371 of International Application No. PCT/KR2007/004533, filed Sep. 19, 2007, published in English, which claims the benefit of Korean Patent Application No. 10-2006-0093126, filed Sep. 25, 2006. The disclosures of said applications are incorporated by reference herein.

TECHNICAL FIELD

The present invention relates to a non-aqueous electrolyte, an electrode and an electrochemical device comprising the same. More particularly, the present invention relates to a non-aqueous electrolyte comprising a compound capable of improving the lifespan and thermal stability of an electrochemical device, and an electrochemical device comprising the same. Also, the present invention relates to an electrode comprising a reduced form of a compound capable of improving the lifespan and thermal stability of an electrochemical device, and an electrochemical device comprising the same.

BACKGROUND ART

Recently, there has been increasing interest in energy storage technology. As batteries have been widely used as energy sources in portable phones, camcorders, notebook computers, PCs and electric cars, research and development of electrochemical devices have been made intensively. In this regard, electrochemical devices are subjects of great interest. Particularly, development of rechargeable secondary batteries has been the focus of attention. More recently, research and development of an electrode and a battery having a novel design have been conducted in order to improve capacity density and specific energy thereof.

Among the currently used secondary batteries, lithium secondary batteries, developed in early 1990's, have drive voltage and energy density higher than those of conventional batteries using aqueous electrolytes (such as Ni-MH batteries, Ni—Cd batteries and $H_2SO_4$—Pb batteries), and thus are spotlighted in the field of secondary batteries. However, a lithium secondary battery has a problem in that it undergoes degradation of quality during repeated charge/discharge cycles. Such problems become more serious as the capacity density of the battery increases.

Therefore, there is a continuous need to develop a means for improving lifespan of a secondary battery.

Japanese Laid-Open Patent No. 2002-158034 discloses an acrylic compound as an additive for an electrolyte, the acrylic compound being able to inhibit gas generation in a lithium secondary battery and deterioration of an anode. Additionally, Japanese Laid-Open Patent No. 2003-168479 discloses that the use of an acrylic compound having at least three acryl groups as an additive for an electrolyte in a lithium secondary battery leads to formation of a solid electrolyte interface (SEI) layer via reduction at an anode, and such SEI layers inhibit decomposition of the electrolyte at the anode so as to improve lifespan characteristics of the battery.

DISCLOSURE OF INVENTION

Technical Problem

Therefore, the present invention has been made in view of the above-mentioned problems. The inventors of the present invention have found that when an acrylate compound is used as an additive for an electrolyte in a lithium secondary battery, the SEI layer formed on the anode has properties depending on the number of acrylate groups present in the acrylate compound. In other words, as the number of polymerizable double bonds present in the acrylate compound increases, the resultant SEI layer has higher density and provides a higher passivation effect while showing a significantly increased electric resistance.

Therefore, it is an object of the present invention to provide a non-aqueous electrolyte that comprises an acrylate compound having a smaller number (preferably 2 or less) of acryl groups in its molecule in combination with another acrylate compound having a greater number (preferably 3 or more) of acryl groups in its molecule, thereby imparting optimized properties to the SEI layer.

It is another object of the present invention to provide an electrochemical device comprising the above non-aqueous electrolyte and having improved overall quality.

Technical Solution

In order to achieve the above-mentioned object, there is provided a non-aqueous electrolyte comprising: a first acrylate compound having one or two acryl groups; a second acrylate compound having three or more acryl groups; an electrolyte salt; and an organic solvent.

Also, there is provided an electrode comprising a coating layer formed partially or totally on a surface thereof, the coating layer comprising: (i) a reduced form of a first acrylate compound having one or two acryl groups; and (ii) a reduced form of a second acrylate compound having three or more acryl groups.

Further, there is provided an electrochemical device comprising a cathode, an anode, a separator and a non-aqueous electrolyte, wherein (i) the non-aqueous electrolyte is the aforementioned non-aqueous electrolyte according to the present invention; and/or (ii) the cathode and/or the anode is the aforementioned electrode according to the present invention.

BRIEF DESCRIPTION OF THE DRAWINGS

The foregoing and other objects, features and advantages of the present invention will become more apparent from the following detailed description when taken in conjunction with the accompanying drawing in which:

FIG. 1 is a graph showing the discharge capacity of each of the coin type batteries obtained from Example 3 and Comparative Examples 3-5 measured after each battery is subjected to charge/discharge cycles under 0.5 C at 60° C.

MODE FOR THE INVENTION

The non-aqueous electrolyte according to the present invention is characterized by comprising the first acrylate compound having one or two polymerizable acryl groups in its molecule in combination with the second acrylate compound having at least three acryl groups in its molecule.

As the number of polymerizable groups in an acrylate compound, preferably the number of double bonds of the acryl groups, increases, the SEI layer formed by the acrylate compound at the anode of an electrochemical device, preferably a lithium secondary battery, using the same compound has higher density and provides a higher passivation effect, but has an increased electric resistance.

Therefore, the non-aqueous electrolyte comprising the first acrylate compound having one or two acryl groups in combination with the second acrylate compound having at least three acryl groups according to the present invention forms an SEI layer maintaining a sufficient passivation effect so as to improve the lifespan of an electrochemical device, while not inducing an increase in the resistance of the SEI layer significantly, thereby minimizing a drop in the initial capacity.

Non-limiting examples of the first acrylate compound having one or two acryl groups include, but are not limited to: tetraethyleneglycol diacrylate, polyethyleneglycol diacrylate (molecular weight 50-20,000), bisphenol A ethoxylated diacrylate (molecular weight 100-10,000), 1,4-butanediol diacrylate, 1,6-hexanediol diacrylate, or the like. The above acrylate compounds may be used alone or in combination.

Additionally, non-limiting examples of the second acrylate compound having at least three acryl groups include, but are not limited to: trimethylolpropane triacrylate, trimethylolpropane ethyoxylate triacrylate, trimethylolpropane propoxylate triacrylate, ditrimethylolpropane tetraacrylate, pentaerythritol tetraacrylate, pentaerythritol ethoxylate tetraacrylate, dipentaerythritol pentaacrylate, dipentaerythritol hexaacrylate, tris[2-(acryloyloxy)ethyl]isocyanurate, or the like. The above acrylate compounds may be used alone or in combination.

Each of the first acrylate compound and the second acrylate compound is used in an amount of 0.01-10 wt % in the non-aqueous electrolyte. When each acrylate compound is used in an amount less than 0.01 wt %, the lifespan of an electrochemical device according to the use of the acrylate compound may not be improved sufficiently. When each compound is used in an amount greater than 10 wt %, irreversible capacity increases, and the performance of electrochemical device may be decreased.

The first acrylate compound and the second acrylate compound is used preferably in a weight ratio of 1:10-10:1 (first acrylate compound: second acrylate compound), and more preferably of 1:4-4:1. A weight ratio other than the above range leads to a predominant effect of any one acrylate compound. Thus, a desired effect derived from the combination of the above two types of acrylate compounds is not sufficiently shown.

There is no particular limitation in the electrolyte salt, as long as the electrolyte salt is one currently used for a non-aqueous electrolyte. Non-limiting examples of the electrolyte salt include salts represented by the formula of $A^+B^-$, wherein $A^+$ includes a cation selected from the group consisting of $Li^+$, $Na^+$ and $K^+$, or a combination thereof, and $B^-$ includes an anion selected from the group consisting of $PF_6^-$, $BF_4^-$, $Cl^-$, $Br^-$, $I^-$, $ClO_4^-$, $AsF_6^-$, $CH_3CO_2^-$, $CF_3SO_3^-$, $N(CF_3SO_2)_2^-$ and $C(CF_2SO_2)_3^-$, or a combination thereof. Particularly, a lithium salt is preferred. Such electrolyte salts may be used alone or in combination.

There is no particular limitation in the organic solvent, as long as the solvent is one currently used for a non-aqueous electrolyte. Particular examples of the solvent include cyclic carbonates, linear carbonates, lactones, ethers, esters, sulfoxides, acetonitriles, lactams and/or ketones.

Particular examples of the cyclic carbonates include ethylene carbonate (EC), propylene carbonate (PC), butylene carbonate (BC), fluoroethylene carbonate (FEC), or the like. Particular examples of the linear carbonates include diethyl carbonate (DEC), dimethyl carbonate (DMC), dipropyl carbonate (DPC), ethyl methyl carbonate (EMC), methyl propyl carbonate (MPC), or the like. Particular examples of the lactones include gamma-butyrolactone (GBL) and those of ethers include dibutyl ether, tetrahydrofuran, 2-methyltetrahydrofuran, 1,4-dioxane, 1,2-dimethoxyethane, 1,2-diethoxyethane, or the like. Particular examples of the esters include methyl formate, ethyl formate, propyl formate, methyl acetate, ethyl acetate, propyl acetate, methyl propionate, ethyl propionate, butyl propionate, methyl pivalate, or the like. Additionally, particular examples of the sulfoxides include dimethyl sulfoxide or the like, and those of the lactams include N-methylpyrrolidone (NMP), or the like. Further, particular examples of the ketones include polymethylvinyl ketone. Halogen derivatives of the above organic solvents may also be used. Such organic solvents may be used alone or in combination.

In another aspect of the present invention, the electrode according to the present invention comprises a coating layer, such as a solid electrolyte interface (SEI) layer, formed partially or totally on a surface of the electrode, the coating layer comprising: (i) a reduced form of a first acrylate compound having one or two acryl groups; and (ii) a reduced form of a second acrylate compound having three or more acryl groups.

The coating layer, such as the SEI layer, may be formed upon the first charge or during the subsequent charge/discharge cycles of the electrochemical device using the electrode. The electrode according to the present invention may be obtained by reducing an electrode manufactured according to a method generally known to those skilled in the art, at least once, in the non-aqueous electrolyte comprising the first acrylate compound having one or two acryl groups and the second acrylate compound having at least three acryl groups. In a variant, the electrode according to the present invention may be obtained by inserting a porous separator between a cathode and an anode, manufactured according to a method generally known to those skilled in the art, introducing the non-aqueous electrolyte comprising the first acrylate compound having one or two acryl groups and the second acrylate compound having at least three acryl groups thereto, and by subjecting the resultant cell to at least one charge cycle.

In the electrode according to the present invention, the reduced form of the first acrylate compound and the reduced form of the second acrylate compound may be produced via the reductive decomposition of the first acrylate compound and the second acrylate compound, respectively. Additionally, in the electrode according to the present invention, non-limiting examples of the first acrylate compound and the second acrylate compound are the same as those of the first acrylate compound and the second acrylate compound used in the non-aqueous electrolyte according to the present invention.

In still another aspect of the present invention, the electrochemical device according to the present invention comprises a cathode, an anode, a separator and a non-aqueous electrolyte, wherein the non-aqueous electrolyte is the aforementioned non-aqueous electrolyte according to the present invention.

In a variant, the electrochemical device according to the present invention comprises a cathode, an anode, a separator and a non-aqueous electrolyte, wherein the cathode and/or the anode are/is the aforementioned electrode according to the present invention. Herein, the non-aqueous electrolyte may be the aforementioned non-aqueous electrolyte according to the present invention.

The electrochemical device according to the present invention includes all types of devices in which electrochemical reactions are performed. Particular examples of the electrochemical device include all types of primary batteries, secondary batteries, fuel cells, solar cells, capacitors, or the like. Among the secondary batteries, lithium secondary batteries, including lithium metal secondary batteries, lithium ion secondary batteries, lithium polymer secondary batteries or lithium ion polymer secondary batteries, are preferred.

The electrochemical device may be obtained by using a conventional method known to those skilled in the art. For example, a porous separator is inserted between a cathode and an anode to form an electrode assembly, and then an electrolyte is injected thereto.

The electrode used in the electrochemical device according to the present invention may be manufactured by a conventional method known to one skilled in the art. For example, an electrode active material may be mixed with a solvent, and optionally with a binder, a conductive agent and a dispersant, and the mixture is agitated to provide slurry. Then, the slurry is applied onto a metal collector, and the collector coated with the slurry is compressed and dried to provide an electrode.

The binder and the conductive agent may be used in an amount of 1-10 parts by weight and 1-30 parts by weight, respectively, per 100 parts by weight of the electrode active material.

The electrode active material includes a cathode active material or an anode active material.

Cathode active materials that may be used in the present invention include: lithium transition metal composite oxides, such as $LiM_xO_y$ (M=Co, Ni, Mn, $Co_aNi_bMn_c$) (e.g. lithium manganese composite oxides such as $LiMn_2O_4$, lithium nickel oxides such as $LiNiO_2$, other oxides obtained by substituting manganese, nickel and cobalt in the above oxides partially with other transition metals, or lithium-containing vanadium oxide, etc.); or calcogenides, such as manganese dioxide, titanium disulfide, molybdenum disulfide, etc. More particularly, $LiCoO_2$, $LiNiO_2$, $LiMnO_2$, $LiMn_2O_4$, $Li(Ni_a Co_bMn_c)O_2$ (0<a<1, 0<b<1, 0<c<1, a+b+c=1), $LiNi_{1-Y}Co_YO_2$, $LiCo_{1-Y}Mn_YO_2$, $LiNi_{1-Y}Mn_YO_2$ (wherein 0≤Y<1), $Li(Ni_aCo_bMn_c)O_4$ (0<a<2, 0<b<2, 0<c<2, a+b+c=2), $LiMn_{2-z}Ni_zO_4$ $LiMn_{2-z}Co_zO_4$ (wherein 0<z<2), $LiCoPO_4$, $LiFePO_4$ or a mixture thereof is preferred.

Anode active materials that may be used in the present invention include those currently used in anodes for electrochemical devices. Particular examples of the anode active materials include lithium metal, lithium alloys, carbon, petroleum coke, activated carbon, graphite or carbon fiber capable of lithium ion intercalation/deintercalation. Other metal oxides capable of lithium intercalation/deintercalation and having a potential vs. $Li^+/Li$ of less than 2V (for example, $TiO_2$ or $SnO_2$) may also be used. Particularly, carbonaceous materials, such as graphite, carbon fiber or activated carbon, are preferred.

There is no particular limitation in the current collector, as long as the collector is formed of a highly conductive metal, allows easy attachment of slurry of an electrode active material thereto, and has no reactivity in the drive voltage range of the battery. Non-limiting examples of a cathode collector include foil formed of aluminum, nickel or a combination thereof. Non-limiting examples of an anode collector include foil formed of copper, gold, nickel, copper alloys or a combination thereof.

Particular examples of the binder that may be used in the present invention include polytetrafluoroethylene (PTFE), polyvinylidene fluoride (PVdF), or the like.

There is no particular limitation in the conductive agent, as long as the conductive agent is an electroconductive material that does not cause a chemical change in the electrochemical device. In general, carbon black, graphite, carbon fibers, carbon nanotubes, metal powder, conductive metal oxide, organic conductive agents may be used. Commercially available conductive agents include acetylene black-based conductive agents (available from Chevron Chemical Company or Gulf Oil Company), Ketjen Black EC series (available from Armak Company), Vulcan XC-72 (available from Cabot Company) and Super P (available from MMM Co.).

As the solvent for forming the slurry, organic solvents, such as NMP (N-methyl pyrrolidone), DMF (dimethyl formamide), acetone or dimethyl acetamide, water, etc. may be used. Such solvents may be used alone or in combination. The solvent is used in an amount sufficient for dissolving and dispersing the electrode active material, the binder and the conductive agent therein, considering the coating thickness of the slurry and the productivity.

Although there is no particular limitation in the separator that may be used in the present invention, a porous separator is preferred, and particular examples thereof include polypropylene-based, polyethylene-based, and polyolefin-based porous separators.

Further, although there is no particular limitation in the outer shape of the electrochemical device according to the present invention, the electrochemical device may have a cylindrical shape using a can, a prismatic shape, a pouch-like shape or a coin-like shape.

Reference will now be made in detail to the preferred embodiments of the present invention. It is to be understood that the following examples are illustrative only and the present invention is not limited thereto.

EXAMPLE 1

First, 1M $LiPF_6$ was dissolved into an organic solvent containing ethylene carbonate (EC), propylene carbonate (PC) and diethyl carbonate (DEC) in a ratio of 2:1:7 (v:v:v, EC:PC:DEC) to provide a solution. Next, 0.8 wt % of tetraethyleneglycol diacrylate (TEGDA) having two acryl groups and represented by the following Formula 1, and 0.2 wt % of trimethylolpropane triacrylate (TMPTA) having three acryl groups and represented by the following Formula 2 were added to the solution as additives to provide an electrolyte.

$LiCoO_2$ was used as a cathode active material and artificial graphite was used as an anode active material. A coin type battery was provided by using the cathode active material, the anode active material and the electrolyte obtained as described above.

[Formula 1]

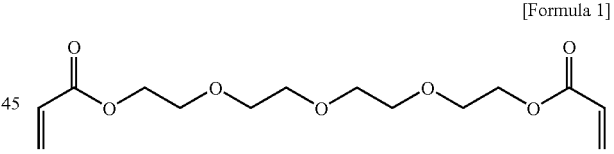

[Formula 2]

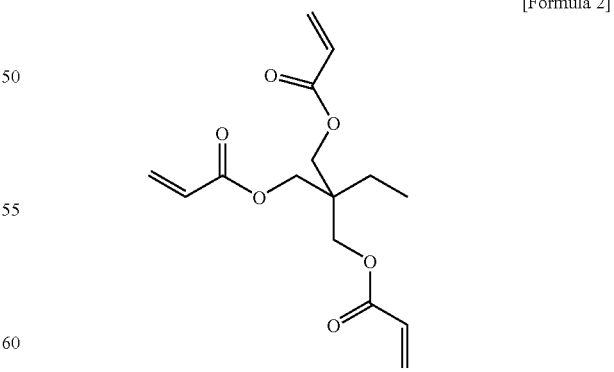

EXAMPLE 2

An electrolyte and a battery were provided in the same manner as described in Example 1, except that 0.2 wt % of TEGDA (Formula 1) having two acryl groups and 0.8 wt % of TMPTA (Formula 2) having three acryl groups were used as additives.

COMPARATIVE EXAMPLE 1

An electrolyte and a battery were provided in the same manner as described in Example 1, except that 1 wt % of TEGDA (Formula 1) having two acryl groups was used alone as an additive, and no TMPTA (Formula 2) having three acryl groups was added.

COMPARATIVE EXAMPLE 2

An electrolyte and a battery were provided in the same manner as described in Example 1, except that no TEGDA (Formula 1) having two acryl groups was added, and 1 wt % of TMPTA (Formula 2) having three acryl groups was used alone as an additive.

EXPERIMENTAL EXAMPLE 1

Test for Initial Capacity and Lifespan at Room Temperature

The coin type batteries according to Examples 1 and 2 and Comparative Examples 1 and 2 were subjected to charge/discharge cycles at room temperature under 0.5 C. Each battery was measured for the initial capacity and the capacity maintenance (%) after 50 charge/discharge cycles. The following Table 1 shows the results.

TABLE 1

[Table 1]
[Table]

| | Additives | Initial capacity (mAh) | Capacity maintenance (%) after 50 cycles based on initial capacity |
|---|---|---|---|
| Ex. 1 | TEGDA 0.8 wt % TMPTA 0.2 wt % | 5.1 | 86.3 |
| Ex. 2 | TEGDA 0.2 wt % TMPTA 0.8 wt % | 5.2 | 84.2 |
| Comp. Ex. 1 | TEGDA 1 wt % TMPTA 0 wt % | 5.3 | 65.7 |
| Comp. Ex. 2 | TEGDA 0 wt % TMPTA 1 wt % | 4.2 | 87.0 |

As shown in Table 1, the batteries according to Examples 1 and 2 and Comparative Example 1 showed the highest initial capacity. On the other hand, the battery using the acrylate compound having three acryl groups alone according to Comparative Example 2 showed the lowest initial capacity. It is thought that this is because the SEI layer formed by the acrylate compound having three acryl groups has a high electric resistance.

Additionally, the battery using the acrylate compound having two acryl groups alone according to Comparative Example 1 showed a lower capacity maintenance when compared to the batteries using the acrylate compound having two acryl groups in combination with the acrylate compound having three acryl groups according to Examples 1 and 2, as well as the battery using the acrylate compound having three acryl groups alone according to Comparative Example 2. It is thought that this is because the SEI layer formed by the acrylate compound having two acryl groups alone cannot provide a sufficient passivation effect.

As can be seen from the above results, the combination of the acrylate compound having two acryl groups with the acrylate compound having three acryl groups can minimize degradation of the initial capacity as well as a drop in the capacity after repeating charge/discharge cycles.

EXAMPLE 3

An electrolyte and a battery were provided in the same manner as described in Example 1, except that 0.25 wt % of TEGDA (Formula 1) having two acryl groups and 0.25 wt % of ditrimethylolpropane tetraacrylate (DTMPTA) having four acryl groups and represented by the following formula 3 were added.

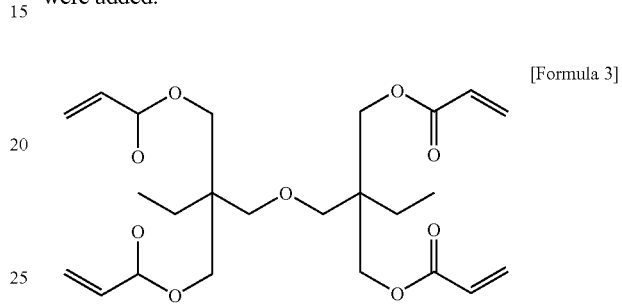

[Formula 3]

COMPARATIVE EXAMPLE 3

An electrolyte and a battery were provided in the same manner as described in Example 1, except that no DTMPTA (Formula 3) having four acryl groups was added and 0.25 wt % of TEGDA (Formula 1) having two acryl groups was used alone as an additive.

COMPARATIVE EXAMPLE 4

An electrolyte and a battery were provided in the same manner as described in Example 1, except that no TEGDA (Formula 1) having two acryl groups was added and 0.25 wt % of DTMPTA (Formula 3) having four acryl groups was used alone as an additive.

COMPARATIVE EXAMPLE 5

A battery was provided in the same manner as described in Example 1, except that the electrolyte was obtained by dissolving 1M $LiPF_6$ into an organic solvent containing ethylene carbonate (EC), propylene carbonate (PC) and diethyl carbonate (DEC) in a ratio of 2:1:7 (v:v:v, EC:PC:DEC), and no additive was used.

EXPERIMENTAL EXAMPLE 2

Hot Box Test

Each of the coin type batteries according to Example 3 and Comparative Examples 3-5 was subjected to charge/discharge cycles at 60° C. under 0.5 C, and was measured for the discharge capacity. The results are shown in FIG. 1.

As shown in FIG. 1, the battery according to Example 3 showed the best lifespan characteristics. The battery using the acrylate compound having two acryl groups alone according to Comparative Example 3 or the battery using the acrylate compound having four acrylate groups alone according to Comparative Example 4 showed no improvement in the high-temperature lifespan characteristics, as compared to the battery using no additive according to Comparative Example 5. This demonstrates that the SEI layer formed by the combination of the above two types of acrylate compounds has improved thermal stability as compared to the thermal stability of the SEI layer formed by each single compound.

Therefore, it can be seen from the above test results of Experimental Examples 1 and 2 that the properties of the SEI layer formed on the anode by acrylate compounds can be controlled by adjusting the number of acryl groups in the acrylate compounds.

INDUSTRIAL APPLICABILITY

As can be seen from the foregoing, the non-aqueous electrolyte according to the present invention comprises a first acrylate compound having one or two acryl group in combination with a second acrylate compound having at least three acryl groups. The SEI layer formed by the above compounds shows an excellent passivation effect so as to improve the lifespan characteristics of the electrochemical device, while not inducing an increase in the electric resistance, thereby minimizing a drop in the initial capacity of the electrochemical device. Additionally, the SEI layer shows improved thermal stability so as to improve the high-temperature lifespan characteristics of the electrochemical device.

Although several preferred embodiments of the present invention have been described for illustrative purposes, those skilled in the art will appreciate that various modifications, additions and substitutions are possible, without departing from the scope and spirit of the invention as disclosed in the accompanying claims.

The invention claimed is:

1. A non-aqueous electrolyte solution comprising: a first acrylate compound having one or two acryl groups; a second acrylate compound having three or more acryl groups; an electrolyte salt; and an organic solvent,
   wherein each of the first acrylate compound and the second acrylate compound is present in an amount of 0.01-10 wt % in the non-aqueous electrolyte solution, and
   wherein the first acrylate compound and the second acrylate compound are present in a weight ratio of 1:10-10:1.

2. The non-aqueous electrolyte solution of claim 1, wherein the first acrylate compound is at least one compound selected from the group consisting of tetraethyleneglycol diacrylate, polyethyleneglycol diacrylate having a molecular weight of 50-20,000, bisphenol A ethoxylated diacrylate having a molecular weight of 100-10,000, 1,4-butanediol diacrylate, and 1,6-hexanediol diacrylate.

3. The non-aqueous electrolyte solution of claim 1, wherein the second acrylate compound is at least one compound selected from the group consisting of trimethylolpropane triacrylate, trimethylolpropane ethyoxylate triacrylate, trimethylolpropane propoxylate triacrylate, ditrimethylolpropane tetraacrylate, pentaerythritol tetraacrylate, pentaerythritol ethoxylate tetraacrylate, dipentaerythritol pentaacrylate, dipentaerythritol hexaacrylate, and tris[2-(acryloyloxy)ethyl]isocyanurate.

4. The non-aqueous electrolyte solution of claim 1, wherein the electrolyte salt is formed by combination of: (i) a cation selected from the group consisting of $Li^+$, $Na^+$ and $K^+$, and (ii) an anion selected from the group consisting of $PF_6^-$, $BF_4^-$, $Cl^-$, $Br^-$, $I^-$, $ClO_4^-$, $AsF_6^-$, $CH_3CO_2^-$, $CF_3SO_3^-$, $N(CF_3SO_2)_2^-$ and $C(CF_2SO_2)_3^-$.

5. The non-aqueous electrolyte solution of claim 1, wherein the organic solvent is at least one solvent selected from the group consisting of cyclic carbonates, linear carbonates, lactones, ethers, esters, sulfoxides, acetonitriles, lactams, ketones and halogen derivatives thereof.

6. An electrochemical device comprising a cathode, an anode, a separator and a non-aqueous electrolyte solution,
   wherein the non-aqueous electrolyte solution comprises a first acrylate compound having one or two acryl groups, a second acrylate compound having three or more acryl groups, an electrolyte salt, and an organic solvent, wherein each of the first acrylate compound and the second acrylate compound is present in an amount of 0.01-10 wt % in the non-aqueous electrolyte solution, and
   wherein the first acrylate compound and the second acrylate compound are present in a weight ratio of 1:10-10:1 in the non-aqueous electrolyte solution.

7. The electrochemical device of claim 6, wherein the electrochemical device is a lithium secondary battery.

8. The electrochemical device of claim 6, wherein the first acrylate compound is at least one compound selected from the group consisting of tetraethyleneglycol diacrylate, polyethyleneglycol diacrylate having a molecular weight of 50-20,000, bisphenol A ethoxylated diacrylate having a molecular weight of 100-10,000, 1,4-butanediol diacrylate, and 1,6-hexanediol diacrylate.

9. The electrochemical device of claim 6, wherein the second acrylate compound is at least one compound selected from the group consisting of trimethylolpropane triacrylate, trimethylolpropane ethyoxylate triacrylate, trimethylolpropane propoxylate triacrylate, ditrimethylolpropane tetraacrylate, pentaerythritol tetraacrylate, pentaerythritol ethoxylate tetraacrylate, dipentaerythritol pentaacrylate, dipentaerythritol hexaacrylate, and tris[2-(acryloyloxy)ethyl]isocyanurate.

10. The electrochemical device of claim 6, wherein the electrolyte salt is formed by combination of: (i) a cation selected from the group consisting of $Li^+$, $Na^+$ and $K^+$, and (ii) an anion selected from the group consisting of $PF_6^-$, $BF_4^-$, $Cl^-$, $Br^-$, $I^-$, $ClO_4^-$, $AsF_6^-$, $CH_3CO_2^-$, $CF_3SO_3^-$, $N(CF_3SO_2)_2^-$ and $C(CF_2SO_2)_3^-$.

11. The electrochemical device of claim 6, wherein the organic solvent is at least one solvent selected from the group consisting of cyclic carbonates, linear carbonates, lactones, ethers, esters, sulfoxides, acetonitriles, lactams, ketones and halogen derivatives thereof.

* * * * *